United States Patent [19]
Gucyski

[11] Patent Number: 6,011,702
[45] Date of Patent: Jan. 4, 2000

[54] LOW NOISE FORWARD/FLYBACK SWITCHING POWER SUPPLY

[76] Inventor: Jeff Gucyski, P.O. Box 11633, Costa Mesa, Calif. 92627

[21] Appl. No.: 09/053,532

[22] Filed: Mar. 31, 1998

[51] Int. Cl.[7] .............................. H02M 3/335; H02M 3/24
[52] U.S. Cl. ................................... 363/21; 363/25; 363/97
[58] Field of Search .................................. 363/21, 22, 23, 363/24, 25, 39, 40, 78, 97, 133, 134

[56] References Cited

U.S. PATENT DOCUMENTS

| | | | |
|---|---|---|---|
| 5,239,453 | 8/1993 | Remson | 363/19 |
| 5,267,132 | 11/1993 | Gulcznski | 363/16 |
| 5,301,095 | 4/1994 | Termoto et al. | 363/21 |
| 5,440,473 | 8/1995 | Ishii et al. | 363/21 |
| 5,570,278 | 10/1996 | Cross | 363/20 |
| 5,600,546 | 2/1997 | Ho et al. | 363/21 |
| 5,637,988 | 6/1997 | Gucyski | 323/222 |
| 5,652,700 | 7/1997 | Tsai et al. | 363/21 |

*Primary Examiner*—Adolf Deneke Berhane
*Assistant Examiner*—Bao Q. Vu

[57] ABSTRACT

Low noise DC/DC switching power supply employs a transformer, a main switch and an auxiliary switch. The auxiliary switch merely reflects the switching of the main switch and has lower voltage ratings. A maximum noise suppression is accomplished when both switches have the same current ratings. The power supply takes advantage of some resonant properties but operates in forward and/or flyback square wave modes. When the main switch is turned off, a leakage energy stored in the transformer is delivered to a capacitor. Subsequently, both switches are turned on, wherein the capacitor voltage is applied across the primary winding of the transformer. When the capacitor voltage is reduced to a desired value, the auxiliary switch turns off, wherein the primary voltage is reduced to the input voltage. The difference between both primary voltages is thus regulated. The EMI/RFI performance of the power supply is dramatically improved. A discontinuous mode allows uninterrupted input current at any time.

19 Claims, 5 Drawing Sheets

LOW NOISE FORWARD/FLYBACK SWITCHING POWER SUPPLY

CROSS REFERENCE TO RELATED INVENTIONS

The present invention is related by subject matter to co-pending application filed on even date herewith, titled "Pushpull Switching Power Supply Having Increased Efficiency and Incorporating Power Factor Correction," which is hereby incorporated by reference. This invention is also related to the following U.S. Patents by the same inventor: U.S. Pat. Nos. 5,736,841, 5,637,988, 5,426,413, 5,382,843, 5,270,904, 5,267,132, 5,252,974, 5,225,767, 5,221,887, 5,214,430, 5,206,649, 5,196,995, 5,173,698, 5,164,657, 5,164,656, 5,155,489, 5,155,430, 5,155,381, 5,146,399, 5,099,241, 5,057,990, 5,041,832, 4,999,568, 4,980,686, 4,980,649, 4,958,155, 4,956,760, 4,949,234, 4,947,308, 4,943,740, 4,940,982, 4,940,906, 4,929,848, 4,871,980, 4,866,398, 4,857,931, 4,853,837, 4,845,391, 4,843,392, 4,837,572, 4,829,263, 4,811,017, 4,803,610, 4,782,306, 4,763,106, 4,763,080, 4,749,958, 4,749,953, 4,736,286, 4,714,894, 4,634,996 and 4,476,441.

FIELD OF THE INVENTION

The invention relates to a switching power supply (SPS) converting a DC input voltage into a DC output voltage, wherein the input voltage is applied to a primary winding of a power transformer only when one or two switches are closed.

BACKGROUND OF THE INVENTION

Every off-line SPS includes two sections: a conversion circuit and a supporting section. The conversion circuit includes all components that are necessary to perform the conversion, as if these components were ideal. The conversion circuit may be therefore just slightly simpler than one used in an actual SPS that operates without any load but is capable of delivering a full output power for a brief period of time. The conversion circuit comprises input capacitor, power switch, power transformer, output rectifier, etc. Furthermore, the circuit comprises components that ensure a safe and proper operation of the SPS. Those components include fuse, inrush current limiter, transient protector, power switch driver, primary current sensor, feedback circuit incorporating frequency compensation and line isolation, etc.

The supporting section exists only due to imperfections of the components used in the conversion circuit, in particular power devices. Basically, the supporting section is used to clean up the mess caused by the switching operation of the SPS delivering the full output power. The supporting section includes input and output filters, heat sinks, snubbers, shields, magnetic ducts, ferrite beads, etc.

Obviously, a common goal is to minimize the supporting section. One tendency is to use better components. For example, power semiconductors that switch faster and conduct better result in a higher efficiency of the SPS, reduced drive currents and smaller heat sinks. They also allow a higher switching frequency that results in smaller inductive and capacitive components. However, those better semiconductors may not be acceptable in a price sensitive environment.

Another tendency is to incorporate the parasitic elements into the conversion circuit rather than merely fight the consequences of their existence. Sometimes only a partial integration is possible. For example, on-resistance of the power switch can be used for the current sensing. However, the on-resistance does still contribute to the power dissipation of the switch. In other cases, a complete integration of the parasitic elements is possible. For example, some resonant type SPSs use the leakage inductance of the power transformer as the basic component of the resonant network.

Today's low power SPSs are dominated by forward and flyback SPSs. The input voltage is applied across the primary winding of the power transformer when one or two switches are closed. In one switch SPSs the energy stored in the leakage inductance of the power transformer is transferred to a passive snubber network, when the switch opens. A largest possible portion of the leakage energy is dissipated as heat to minimize another portion that is inevitably converted into EMI/RFI.

Forward SPSs are also often used in a medium power range. One switch forward SPS may comprise a reset winding. Voltage ratings of the switch are twice the input voltage. These ratings are cut in half in two switch forward SPS. Respective rectifiers have equal voltage ratings and peak current capabilities. When the switch or switches turn off, the energy stored in the transformer is returned to the input source. However, the input current responds in the worst possible manner as it changes its polarity at the peak. The input capacitor is then recharged by the current spike. This results in a voltage ripple that appears across the input of the SPS. Very often the current spike causes high frequency oscillations that are very difficult to filter. The circuit complexity and cost are degraded.

Generally, resonant type SPSs are inherently inferior to square wave type SPSs. In the resonant type SPSs a sinusoidal voltage arid/or current is developed. That, however, is associated with a considerable interval, usually near zero crossing of the respective sinusoidal signal, while a minimal or no energy transfer takes place. Therefore, the resonant SPSs require power semiconductors having higher current and/or voltage ratings. An output capacitor carries a high ripple current. By contrast, in square wave type SPSs a maximum energy transfer is accomplished instantaneously.

The resonant type SPSs have other inherent flaws. The resonant or switching frequency is determined by additional LC components, or an additional capacitor and the leakage inductance of the power transformer. These components are fixed and so is the turn-on or turn-off time. Pulse frequency modulation (PFM) rather than pulse width modulation (PWM) or other preferred switching method is often used to accomplish the regulation. A minimum load may be necessary to avoid large variations of the switching frequency. Moreover, the maximum switching frequency can be quite high if it is determined by the leakage inductance. The resonant type SPSs are preferred in special applications, such a high voltage conversion. General purpose SPS are costly and constitute a small fraction of all SPSs manufactured today.

SPSs have a tremendous drawback comparing with linear power supplies. Any SPS is basically a high power oscillator that is rich with switching harmonics. Moreover, if the AC line is used as the input source, numerous line frequency harmonics are created. The SPSs are therefore excellent sources of both conducted and radiated EMI. The power is not transferred to the output during the time allowed for charging or resetting the transformer. Therefore, the output ripple voltage delivered to the load is significantly larger.

The leakage inductance of the power transformer is often the key parasitic element and the largest single factor in degrading the performance of an off-line SPS. An ideal transformer has no leakage inductance because magnetic fields generated by the primary winding are entirely contained by the core and coupled completely to the secondary winding. The leakage inductance represents magnetic fields that do not couple with both the primary and secondary windings. The leakage inductance can be also expressed as a sum of the primary leakage inductance and the secondary leakage inductance multiplied by the square of the turns ratio.

The inductive leakage energy is transferred to a snubber capacitor. A diode is employed for charging the capacitor to a peak voltage. However, parasitic capacitances are charged to that voltage as well. As the diode ceases the conduction, the respective resonant circuit continues to oscillate at a very high frequency. Obviously, the oscillations appear directly at the input. They are also applied to the collector or drain of the power switch, usually its case, and further a heat sink. Moreover, the oscillations are also transferred to all other windings and are thus applied to all components connected thereto. The number and size of filters, snubbers, shields and beads determine merely a distribution of the leakage energy that is wasted in form of heat and EMI/RFI.

The value of the leakage inductance is determined primarily by physical dimensions. For example, safety regulations of various countries require specified amounts of spacing and insulation between the windings. Turns ratio of a typical off-line transformer makes it difficult for the secondary winding to uniformly cover the primary winding. Furthermore, economics may be an overriding consideration since some core shapes are easier and less expansive to wind than others. Transformer design becomes a tradeoff between these and other factors that always result in a significant amount of the leakage inductance.

SUMMARY OF THE INVENTION

The present invention is intended to provide a DC/DC SPS generating a significantly reduced amount of noise, including EMI/RFI, but without sacrificing the efficiency. The DC input voltage may vary in a wide range such as rectified and filtered universal line voltage. The SPS can operate in forward and/or flyback modes, wherein the energy is transferred from the input to the output while a main switch is turned on and/or off. The SPS incorporates the snubber capacitor as well as some parasitic components of the power devices into the conversion circuit. Although their resonant properties are used, the SPS operates entirely in the square wave mode. This also allows any kind of switching including a free running operation, PFM and PWM.

The SPS employs a transformer, the main switch and an auxiliary switch. However, ratings of the auxiliary switch may be significantly smaller than those of the main switch. A maximum noise suppression is accomplished when both switches have the same current ratings. The switching of the auxiliary switch merely reflects the switching of the main switch. For example, the auxiliary switch can turn on when the main switch turns on, and turn off before the main switch turns off. This dramatically simplifies a driver circuitry of the auxiliary switch.

The input current is not abruptly interrupted but continues to flow after the main switch turns off. The leakage energy of the power transformer is transferred to the capacitor during off-time of the main switch. It is returned to the transformer immediately during the following on-time. Only a mere fraction of the leakage energy is returned to the input source or even becomes a parasitic energy that is lost. The ratio of the maximum to minimum voltage applied across the primary winding of the power transformer is smaller than the ratio of the maximum to minimum input voltage of the SPS. This allows a higher switching frequency without sacrificing the efficiency of the SPS.

The difference between the capacitor voltage and the input voltage of the SPS is precisely controlled. That difference may vary slightly in response to the output current and temperature of the SPS but is independent of the input voltage of the SPS. As a result, voltage ratings of power semiconductors that include the main switch, are decreased. Moreover, the EMI/RFI performance is significantly improved. Output noise generated by the SPS, including an output ripple voltage, is dramatically improved. This is quite significant since a low output ripple voltage is the primary reason why linear power supplies are preferred to SPSs.

SPS according to the present invention converts an input voltage applied between an input terminal and ground into an output voltage and comprises: a first inductive means coupled to the input terminal for attaining a first current and providing the output voltage; a first switching means for selectively applying the first current to ground; a capacitive means having a terminal for storing a voltage; a rectifying means for applying the first current to the capacitive means terminal; a second inductive means for attaining a second current; and a second switching means for selectively applying the second current to the capacitive means terminal.

In another embodiment the SPS comprises: an inductive means for providing the output voltage, and having a first and second terminals for attaining a current; a capacitive means for storing a voltage; a first switching means for selectively coupling the first terminal to ground; a first rectifying means coupled to the first terminal for applying the current to the capacitive means; a second switching means coupled to the second terminal for selectively applying the current to the capacitive means; and a second rectifying means coupled to the second terminal for applying the current to the input terminal.

BRIEF DESCRIPTION OF THE DRAWINGS

The present invention will become more clear in conjunction with the accompanying figures of which.

DETAILED DESCRIPTION OF THE INVENTION

Figure 1:
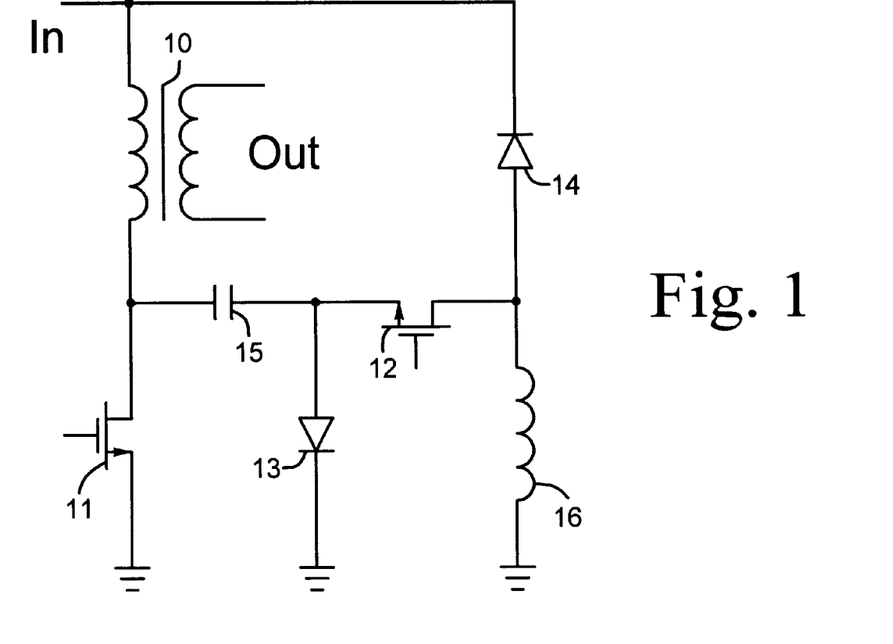
FIG. 1 is an embodiment of the SPS with grounded inductor.

FIG. 1 is an embodiment of the SPS with grounded inductor. The power transformer 10 has the primary winding connected between the input of the SPS and the drain of the main switch 11, N-channel MOSFET. The output circuit shown in FIG. 4 can be used for converting a voltage appearing across the secondary winding into the output voltage, wherein the SPS can operate in the forward and/or flyback modes. The capacitor 15 is connected between the drain of the switch 11 and the anode of the diode 13. The source and drain of the auxiliary switch 12, N-channel MOSFET, are connected to the anodes of the diodes 13 and 14 respectively. The inductor 16 is connected to the anode of the diode 14. The cathode thereof is connected to the input. The source of the switch 11, the cathode of the diode 13, and the inductor 16 are grounded.

When the switch 11 is turned on, the input voltage is applied across the primary winding. Moreover, the capacitor voltage is applied across the diode 13, wherein the voltage appearing at its anode is negative. When the switch 11 is turned off, the diode 13 conducts the leakage current of the transformer 10. The current charges the capacitor 15 to a peak voltage that is greater than the input voltage of the SPS. The capacitor voltage appears across the switch 11.

The switch 12 turns on before the switch 11 turns on. Therefore, the switch 12 turns on at zero voltage and zero current. When both switches are closed, the voltage stored in the capacitor 15 is also applied across the inductor 16. When the voltage across the capacitor 15 is reduced to the desired value, the switch 12 turns off. The switch 11 continues to conduct the primary current. The diode 14 takes over the current of the inductor 16, wherein the voltage thereacross is approximately equal to the input voltage of the SPS. The excess energy of the capacitor 15, now stored in the inductor 16, is returned to the input source. By these means, the capacitor voltage is maintained within a predetermined range regardless of the level of the input voltage. The inductor 16 is discharged before the switch 11 turns on again.

Figure 2:
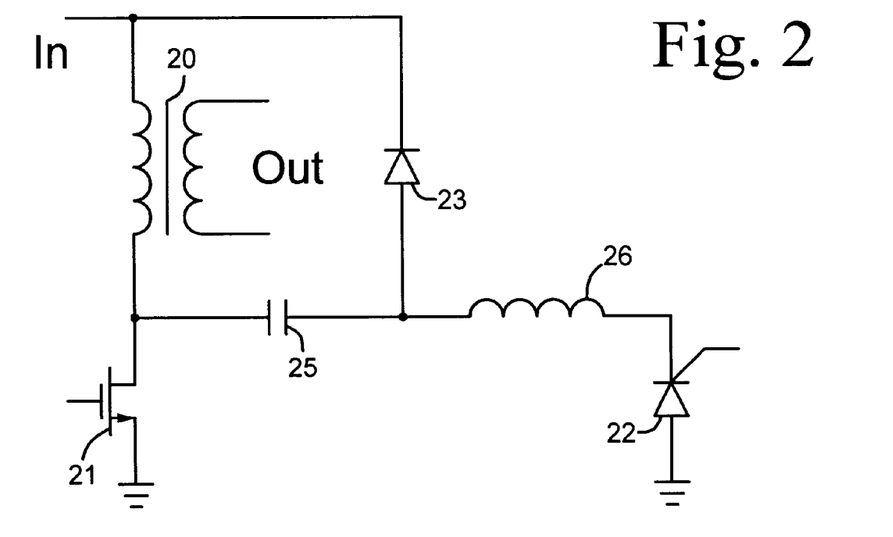
FIG. 2 is an embodiment with an inductor connected in series with the auxiliary switch to ground.

FIG. 2 is an embodiment with an inductor connected in series with the auxiliary switch to ground. The power transformer 20 has the primary winding connected between the input of the SPS and the drain of the main switch 21, N-channel MOSFET. The output circuit shown in FIG. 4 can be used for converting a voltage appearing across the secondary winding into the output voltage, wherein the SPS can operate in the forward and/or flyback modes. The capacitor 25 is connected between the drain of the switch 21 and the anode of the diode 23. The cathode thereof is connected to the input. The inductor 26 is connected between the anode of the diode 23 and the cathode of the auxiliary switch 22, a thyristor. The source of the switch 21 and the anode of the switch 22 are grounded.

When the switch 21 is turned on, the input voltage is applied across the primary winding. Moreover, the voltage applied to the anode of the diode 23 is negative. The voltage thereacross is approximately equal to the sum of the input voltage and the capacitor voltage. The switch 22 turns on before the switch 21 turns off. The time interval is predetermined by an error voltage. When both switches are closed, the voltage stored in the capacitor 25 is applied across the inductor 26. The excess energy of the capacitor 25 is transferred to the inductor 26. The error voltage is equal to a difference between the desired capacitor voltage and its instant value when the switch 21 turns off.

When the switch 21 is turned off, the diode 23 conducts the leakage current of the transformer 20. The current charges the capacitor 25 to a peak voltage. The voltage appearing across the switch 21 is approximately equal to the sum of the input voltage and the capacitor voltage. Moreover, the diode 23 takes over the current of the inductor 26, wherein the voltage thereacross is approximately equal to the input voltage of the SPS. The excess energy of the capacitor 25, now stored in the inductor 26, is returned to the input source. By these means, the capacitor voltage is maintained within a predetermined range regardless of the level of the input voltage. Before the switch 21 turns on again, the inductor 26 is discharged and consequently the switch 22 turns off.

Figure 3:
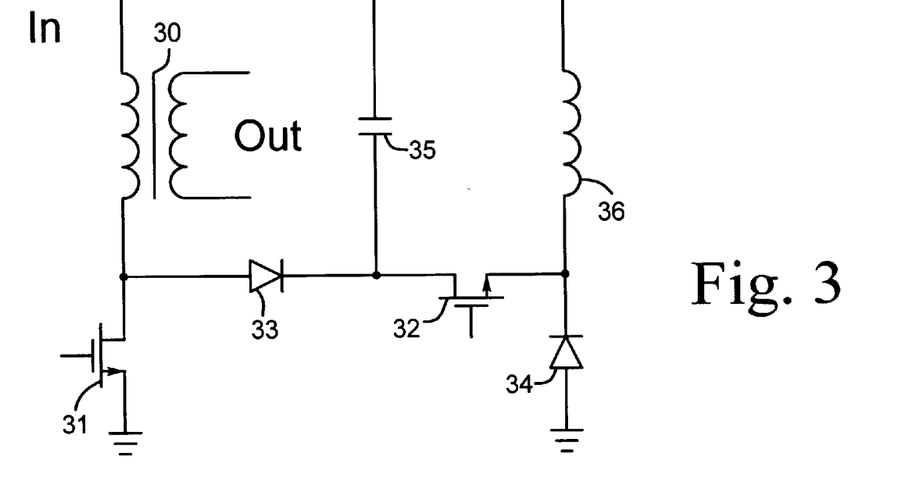
FIG. 3 is an embodiment with an inductor connected to the input.

FIG. 3 is an embodiment with an inductor connected to the input of the SPS. The power transformer 30 has the primary winding connected between the input and the drain of the main switch 31, N-channel MOSFET. The output circuit shown in FIG. 4 can be used for converting a voltage appearing across the secondary winding into the output voltage, wherein the SPS can operate in the forward and/or flyback modes. The anode of the diode 33 is connected to the drain of the switch 31. The capacitor 35 and the inductor 36 are connected to the input and further to the cathodes of the diodes 33 and 34 respectively. Similarly, the drain and source of the auxiliary switch 32, N-channel MOSFET, are connected the cathodes of the diodes 33 and 34 respectively. The source of the switch 31 and the anode of the diode 34 are grounded.

When the switch 31 is turned on, the input voltage is applied across the primary winding. The voltage stored in the capacitor 35 is positive with reference to the input. The voltage across the diode 33 is approximately equal to the sum of the input voltage and the capacitor voltage. When the switch 31 is turned off, the diode 33 conducts the leakage current of the transformer 30. The current charges the capacitor 35 to a peak voltage. The voltage appearing across the switch 31 is approximately equal to the sum of the input voltage and the capacitor voltage.

The switch 32 can operate independently of the switch 31. Preferably, the switch 31 turns on before the switch 31 turns off. The inductor 36 is then coupled in parallel with the capacitor 35 and, when the switch 31 is turned off, shares the leakage current of the transformer 30. The peak voltage of the capacitor 35 may be significantly reduced. When the capacitor voltage is reduced to the desired value, the switch 32 turns off. The diode 34 takes over the current of the inductor 36, wherein the voltage thereacross is approximately equal to the input voltage of the SPS. The excess energy of the capacitor 35, now stored in the inductor 36, is returned to the input source. By these means, the capacitor voltage is maintained within a predetermined range regardless of the level of the input voltage.

Figure 4:
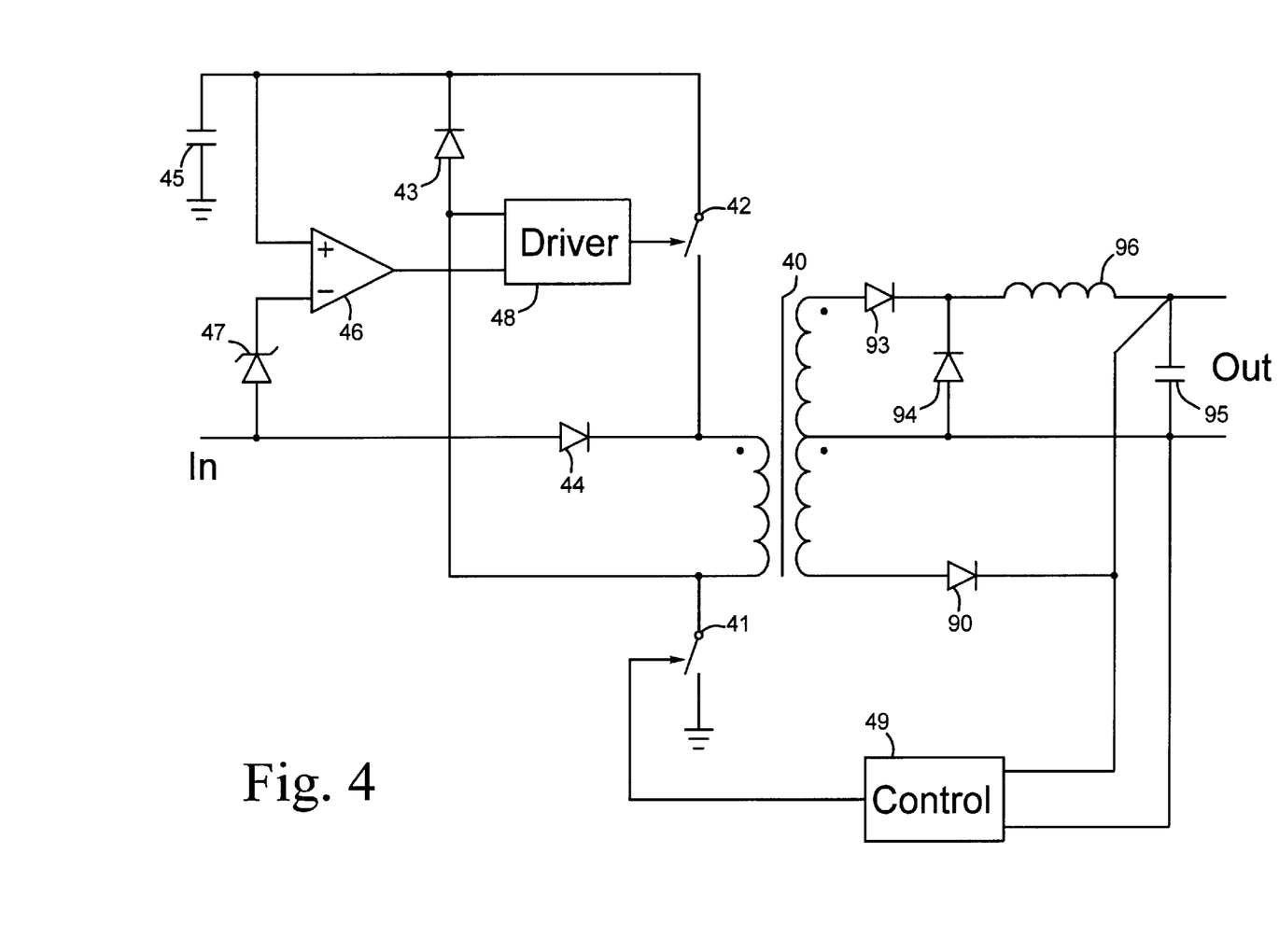
FIG. 4 is the preferred basic topology. The output circuit allows forward and/or flyback modes of operation.

FIG. 4 is the preferred basic topology. The output circuit allows forward and/or flyback modes of operation. The power transformer 40 has the primary winding connected between the anode and the cathode of the diodes 43 and 44 respectively. The main switch 41 and the capacitor 45 are grounded and are further connected to the anode and cathode of the diode 43 respectively. The anode of the diode 44 is connected to the input of the SPS. The auxiliary switch 42 is connected between the cathodes of the diodes 43 and 44.

The secondary winding of the power transformer 40 has a tap, wherein the output voltage of the SPS is referenced thereto. The anodes of the diodes 90 and 93 are connected across the secondary winding. The cathode and anode of the diode 94 is connected to the cathode of the diode 93 and the tap respectively. The voltage appearing across the diode 94 is filtered. Specifically, the inductor 96 is connected between the cathodes of the diodes 90 and 93. The output capacitor 95 is connected between the cathode of the diode 90 and the tap for storing the output voltage of the SPS. The portion of the secondary winding connected between the anode of the diode 93 and the tap has preferably a smaller number of turns than the other portion connected between the anode of the diode 90 and the tap. As a result, the voltage applied across the primary winding is greater than the voltage reflected thereacross when the switch 41 is turned on and off respectively. For example, the peak voltage of the capacitor 45 may be only 50% greater than the input voltage of the SPS.

When the switch 41 is turned on, the SPS operates in the forward mode. The transformer 40 delivers the energy to the output circuit and acts a voltage amplifier having a fixed gain. The diode 93 conducts, whereas the diodes 90 and 94 are reverse biased. The voltage appearing across the diode 94 is greater than the output voltage of the SPS. As a result, the inductor 96 is charged. When the switch 41 is turned off, the SPS operates in the flyback mode, wherein the transformer 40 acts as a charged inductor. The energy stored therein and in the inductor 96 is delivered to the capacitor 95 through the diodes 90 and 94 respectively. The diode 93 is reverse biased. The SPS combines features of conventional forward and flyback SPSs as the output circuits thereof are integrated. Obviously, the forward SPS can be obtained simply by eliminating the diode 90, and the flyback SPS by eliminating the components 93, 94 and 96. In any case, the transformer 40 must suit the selected type of the SPS.

The control circuit 49 of the SPS senses stored in the cape stored in the capacitor 95. The circuit 49 may include an optocoupler for maintaining the line isolation between the input and output of the SPS. Furthermore, the circuit 49 may include means for determining the temperature and current of the switch 41. For example, an excessive primary current indicates an abnormal condition, such as short circuit, and can be determined by sensing a voltage drop across closed switch 41. The circuit 49 controls the switch 41 in response to the output voltage of the SPS. It enforces thus the preferred type of switching such as a free running operation, PFM or PWM.

An auxiliary voltage is defined as a difference between the voltage stored in the capacitor 45 and the input voltage of the SPS. The control circuit of the switch 42 consists of the comparator 46, zener diode 47 and driver 48. The driver 48 is responsive to the comparator 46 that compares the auxiliary voltage with the zener voltage of the diode 47. The diode 47 is biased by an input current of the comparator 46 and represents a source means providing the reference voltage.

The output of the comparator 46 is considered only once; immediately before the switch 41 turns on. This condition is determined by sensing the voltage across the switch 41, the diode 43 or the primary winding of the transformer 40. Therefore, the driver 48 is connected to the anode of the diode 43. The switch 42 turns on at zero current if there is a sufficient time interval between the transformer reset and closing of the switch 41, or if the SPS operates in a discontinuous mode. The switch 42 turns off when the comparator output flips over or the switch 41 turns off.

When both switches 41 and 42 are closed, the voltage stored in the capacitor 45 rather than the input voltage of the SPS is applied across the primary winding. The auxiliary voltage appears across the diode 44. The increasing primary current discharges the capacitor 45. Consequently, the auxiliary voltage drops and eventually the switch 42 turns off. The diode 44 takes over the primary current and the voltage applied across the primary winding is reduced to the input voltage of the SPS. When the switch 41 turns off, the diodes 43 and 44 conduct the leakage current of the transformer 40. The voltage across the capacitor 45 rises. The switch 42 remains open.

A discontinuous mode flyback SPS will be analyzed as an example. The output circuit of the flyback SPS consists merely of the diode 90 and the capacitor 95, whereas the components 93, 94 and 96 are superfluous. The diode 90 conducts only when the switch 41 is turned off. The auxiliary voltage is regulated so as to dramatically reduce the noise of the SPS.

A reflected voltage is the primary voltage of the transformer 40 with the switch 41 turned off. The reflected voltage varies even if the output voltage of the SPS is well regulated. In particular, the forward voltage of the diode 90 drops with decreasing secondary current. The sum of the forward voltage, voltage drops across parasitic series impedances and the output voltage of the SPS is magnified by the turns ratio and appears as the reflected voltage. The parasitic series impedances include the secondary leakage inductance and a resistance of the secondary winding. Moreover, the reflected voltage is initially distorted by parasitic oscillations. For the purpose of simplicity, the reflected voltage is considered the voltage to which the oscillations decay at the peak secondary current. Therefore, the reflected voltage is determined after the switch 41 turns off while a full load is applied to the SPS.

The following equations describe the primary circuit with the switch 41 turned off:

$$\begin{cases} \dfrac{E}{S} = V_A + sLi \\ V_A = \dfrac{V}{s} + \dfrac{1}{sC}\left(\dfrac{J}{s} + i\right) \end{cases}$$

where E is the reflected voltage, V and $V_A$ are initial and instant values of the auxiliary voltage respectively, i is the leakage current and J is the peak primary current, L and C are values of the leakage inductance and the capacitor 45 respectively. Obviously, $V_A = V$ and $i = J$ when the switch 41 turns off, i.e., at t=0. Considering that the input voltage of the SPS is constant, at least within one switching cycle of the SPS, $V_A$ defines variations of the voltage stored in the capacitor 45. The above equations yield:

$$V_A(t) = E + (V - E)\cos\omega t + \dfrac{J}{\omega C}\sin\omega t \quad (*)$$

where $$\omega = \dfrac{1}{\sqrt{LC}}$$

The equation (*) shows that the leakage current causes oscillations. However, these oscillations are reduced merely to a voltage spike, which is one quarter of the respective sine wave. The diodes 43 and 44 rectify the leakage current that charges the capacitor 45 to a peak voltage. That voltage is very critical as it affects voltage ratings of both switches and the diodes 43, 44 and 90. The peak of $V_A$ is obtained by solving the equation:

$$\frac{\partial V_A}{\partial t} = 0$$

However, the equation (*) represents a composite function. The peak value of $V_A$ depends on V. Moreover, the time at which that peak is reached also depends on V. The optimum value of V at which the peak value of $V_A$ is minimal is obtained by solving the equation:

$$\frac{\partial V_A}{\partial V} = \cos\omega t + \frac{\partial V_A}{\partial t}\frac{\partial t}{\partial V} = \cos\omega t = 0$$

Therefore, $V_A$ reaches the peak at:

$$t_{Peak} = \frac{\pi}{2\omega} = \frac{\pi}{2}\sqrt{LC} \quad (**)$$

when V=E

The last condition is met by employing the diode 47 that has the zener voltage equal to E. $V_A$ defines variations of the voltage across the capacitor 45. Substituting equation (**) into equation (*) and rearranging, the increase of the capacitor voltage is:

$$\Delta V_C = V_{APeakMin} - E = J\sqrt{\frac{J}{C}} \quad (***)$$

The diodes 43 and 44 conduct the leakage current. When the voltage of the capacitor 45 reaches the peak value, the leakage current is zero. The diodes 43 and 44 are of the same type and exhibit even parasitic capacitances. However, voltage and current ratings, and thus a parasitic output capacitance, of the switch 41 are significantly larger than those of the switch 42. Therefore, the voltage across the diode 43 changes slightly, whereas significant variations of the primary voltage appear across the diode 44. This is very advantageous as the high frequency radiation of the switch 41 is minimized. The switch 41 usually has a case with a metal chassis, wherein one electrode is connected thereto and to the primary winding. The case is further attached to a large heat sink.

When the capacitor 45 is charged to the peak voltage, so is a composite parasitic capacitance appearing across the primary winding of the transformer 40. That capacitance is affected in particular by the parasitic capacitances of the diodes 43 and 44, the output capacitances of the switches 41 and 42, capacitances between the windings of the transformer 40 and by the circuit layout. The composite parasitic capacitance stores now the parasitic energy that must be disposed of. It is inevitable that a portion of it is converted into EMI/RFI. The leakage inductance and the composite parasitic capacitance constitute another resonant circuit that has an inherently large resonance frequency. The voltage swing across the capacitor 45 is expressed by the equation (***). The total parasitic energy is:

$$\frac{C_P \Delta V_C^2}{2} = \frac{LJ^2}{2}\frac{C_P}{C}$$

where $C_P$ is the value of the composite parasitic capacitance. The parasitic energy is a mere fraction of the leakage energy initially stored in the leakage inductance. The ratio of C to $C_P$ determines the magnitude of the reduction. For example, by quadrupling C the parasitic energy is reduced four times. By comparison, the voltage increase across the capacitor 45 is cut in half according to the equation (*). Furthermore, the time at which the peak of $V_A$ occurs is doubled, as expressed by the equation (). This is also very advantageous as the input current of the SPS fades out at an even slower rate. However, the switch 42 must also sustain a higher current. A maximum noise suppression is accomplished when the current ratings of both switches 41 and 42 are the same. This allows the employment of the capacitor 45 having a maximum value, as shown hereinbelow.

Figure 5:
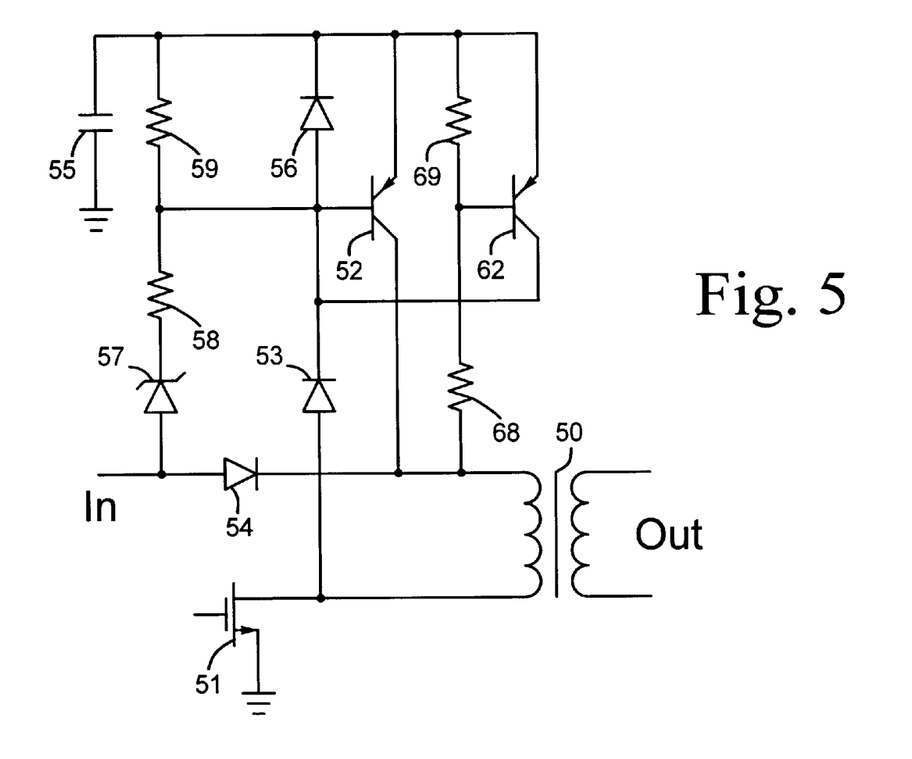
FIG. 5 is an embodiment with an auxiliary PNP transistor and its driver.

FIG. 5 is an embodiment with an auxiliary switch 52, PNP transistor, and its driver. P-channel MOSFET can be also used. This embodiment is based on FIG. 4. The power transformer 50 has the primary winding connected between the anode and the cathode of the diodes 53 and 54 respectively. The output circuit shown in FIG. 4 can be used for converting a voltage appearing across the secondary winding into the output voltage, wherein the SPS can operate in the forward and/or flyback modes. The anode of the diode 54 is connected to the input of the SPS. The drain and source of the main switch 51, N-channel MOSFET, are connected to the anode of the diode 53 and ground respectively. The diodes 53 and 56 are connected in series as the respective cathode and anode are tied together. The capacitor 55 is connected between the cathode of the diode 56 and ground.

The switch 52 has the base, collector and emitter connected to the cathodes of the diode 53, 54 and 56 respectively. The control circuit of the switch 52 consists of the diode 57, the switch 62 and four resistors. Specifically, the zener diode 57 and the resistors 58, 59 are connected in series between the input and the cathode of the diode 56. The resistor 59 is connected in parallel with the diode 56. The switch 62, PNP transistor, has the emitter and collector connected to the emitter and base of the switch 52 respectively. The resistors 68 and 69 are connected in series between the emitter and collector of the switch 52. The resistor 69 is connected between the base and emitter of the switch 62.

When the switch 51 turns on, the switch 52 turns on as well. Therefore, the capacitor voltage rather than the input voltage of the SPS is applied across the primary winding. The auxiliary voltage appears across the diode 54. The increasing primary current discharges the capacitor 55. Consequently, the auxiliary voltage drops and eventually the switch 52 turns off. The diode 54 takes over the primary current and the voltage applied across the primary winding is reduced to the input voltage of the SPS. When the switch 51 turns off, the diodes 53, 54 and 56 conduct the leakage current of the transformer 50. The voltage across the capacitor 55 rises. The switch 52 remains off as its base voltage is reversed.

The switch 62 and resistors 68, 69 dramatically improve the switching performance of the switch 52. The switch 52 is a power transistor with a relatively small gain. As the auxiliary voltage drops, the switch 52 gets out of the saturation. The increasing collector voltage causes higher power losses. The switch 62 is responsive to an excessive collector voltage of the switch 52 and cuts off the base voltage thereof. It would be however inadequate to turn the switch 52 off indirectly through the switch 62. The switch 52 is relatively slow and must be driven by a substantial base current. Therefore, the base-emitter junction of the switch 52 is paralleled by the diode 56. When the switch 51 turns off, the leakage current flowing through the diode 56 causes a reverse current drawn from the base of the switch 52 until its storage charge is depleted.

When the diode 56 conducts, the switch 52 remains shut off as its base voltage is reversed. Moreover, that voltage is also applied between the collector and emitter of the switch 62. Therefore, the switch 62 is ineffective although its base current is sufficiently high. When the leakage current ceases to flow through the diode 56, the switch 62 immediately recovers from its abnormal operating condition. The switch 52 remains open as its base voltage is increased merely to the saturation voltage of the switch 62.

The switch 52 turns on only when the switch 51 turns on. The switch 62 is closed but has a limited collector current capability. The switch 62 has a finite gain and its base current is maintained at a low level by the resistor 68. A large slew rate of the drain voltage of the switch 51 and the parasitic capacitance of the diode 53 result in an increased base voltage of the switch 52. The switch 52 turns on, which causes a depletion of the base and collector currents of the switch 62. The base current of the switch 52 is further maintained by the voltage stored in the capacitor 55 that is fully charged. The auxiliary voltage reduced by the zener voltage of the diode 57 is applied across the resistor divider 58, 59 that produces the base current. If the SPS operates in a discontinuous mode, the switch 52 turns on at zero collector current.

Ratings of the semiconductors can be determined. The maximum voltage appearing across the diode 56 and the switch 62 is equal to the base-emitter voltage of the switch 52. The switch 52 and the diode 54 must sustain the auxiliary voltage. Only the switch 51 and the diode 53 must sustain the peak capacitor voltage. These components and the diodes 54, 56 also conduct currents that reach the peak primary current. By contrast, the switch 52 may have significantly reduced current ratings. It turns off as quickly as the auxiliary voltage is reduced to the desired value. That value is set by the zener voltage of the diode 57 and fine tuned by the resistor divider 58, 59. The switch 52 may turn on at zero collector current. However, it turns off at a substantial collector current, wherein its base current must be considered.

Figure 6:
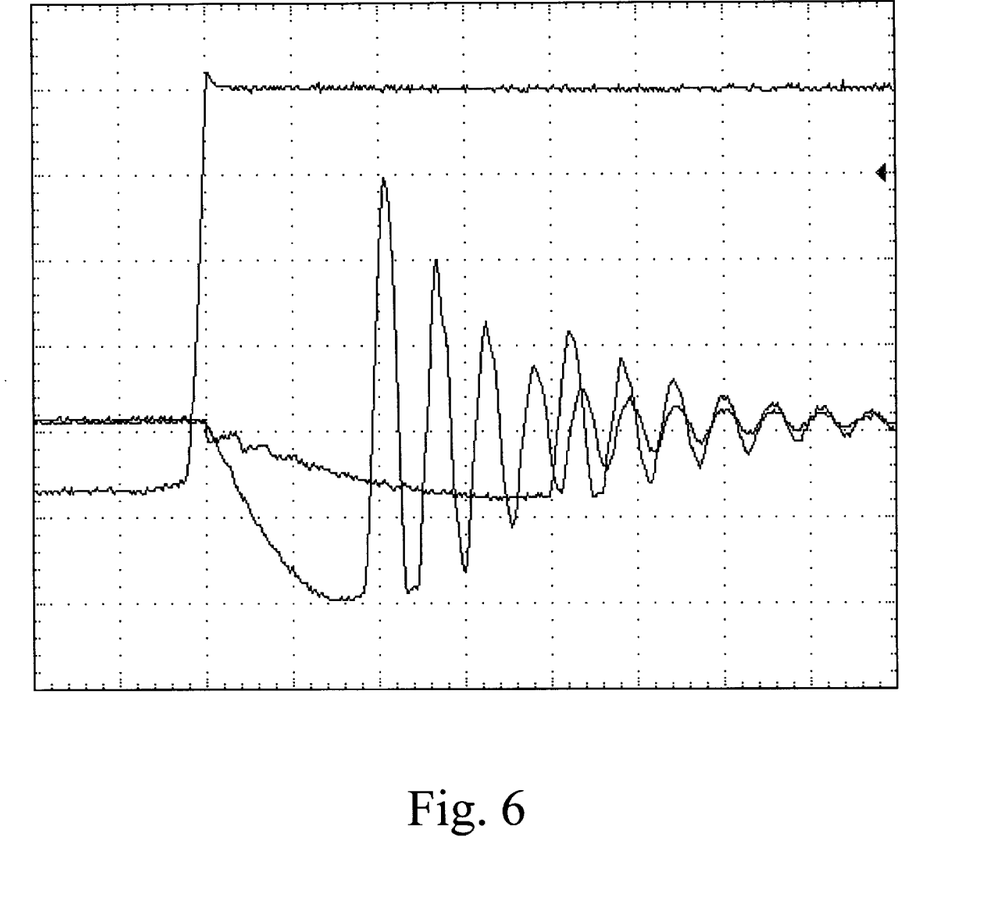
FIG. 6 shows actual waveforms of a prototype based on the FIG. 5 embodiment. Two waveforms represent the primary voltage measured with different capacitor values.

FIG. 6 shows actual waveforms of a prototype based on the FIG. 5 embodiment. An off-the-shelf off-line flyback SPS has been modified in accordance with the present invention. The waveforms reveal voltages appearing at both ends of the primary winding of the transformer 50. Specifically, two waveforms show the collector voltages of the switch 52 measured with different values of the capacitor 55. The third waveform shows the drain voltage of the switch 51. The waveforms have been referenced to the voltage of the capacitor 55 rather than ground potential. When the switch 51 is turned off, its drain voltage is near zero. Therefore, the collector voltages represent the primary voltage.

The waveforms have been acquired from a digital storage oscilloscope sampling at 100 MS/s. The trigger level has been set to −50V as marked by an arrow. The reference voltage lies one division above that level. The measurements have been performed at full load: 12V and 3.5 A. The collector voltages have been measured at the gain of 20V/div and the drain voltage at 50V/div. The horizontal resolution has been set to 500 ns/div. The waveforms reveal also 1000 ns history before opening the switch 51. For the purpose of simplicity, all voltages appearing below the reference level are considered positive.

The collector voltage has been measured first with the capacitor 55 having a value of 20 nF. The respective waveform has been saved for reference. The capacitor value has been then increased to 120 nF. This time the collector and drain voltages have been measured. Each collector voltage appearing before opening the switch 51 is the difference between the voltage to which the capacitor 55 had been discharged in the previous switching cycle, and the input voltage of the SPS. This is the voltage V, i.e., the initial value of the auxiliary voltage. The collector voltage to which the parasitic oscillations decay after opening the switch 51 is the reflected voltage E.

Both collector voltage waveforms show that E is approximately equal to 77V. V has been set to the same voltage by employing 75V zener diode 57 and adjusting values of the resistor divider 58, 59. Therefore, the parasitic oscillations start at and decay to the same voltage. That voltage is unaffected by the value of the capacitor 55. Both waveforms of the collector voltage show an initial spike whose amplitude is $\Delta V_C$. In particular, $\Delta V_C$ is inversely proportional to the square root of C according to the equation (***). The ratio of the capacitor values used for the measurements is 6, which results in the ratio of the amplitudes:

$$\frac{119V - 77V}{95V - 77V} \approx \sqrt{6}$$

The energy stored in the leakage inductance of the transformer 50 is delivered directly to the composite parasitic capacitance and through the diodes 53, 54, 56 to the capacitor 55. Therefore, the oscillations are initially reduced to one quarter of the sine wave. The respective length of time is expressed by the equation (**). Subsequently, the composite parasitic capacitance stores the entire parasitic energy that is dissipated of in form of heat and EMI/RFI. Subsequent parasitic oscillations are uninterrupted and have a dramatically increased frequency.

The magnitude of the initial spike is equal to $\Delta V_C$ and, according to the equation (***), is inversely proportional to the square root of C. The amplitude of the subsequent parasitic oscillations is determined by $\Delta V_C$. Therefore, the ratio of the first peaks of the parasitic oscillations leads to the same result:

$$\frac{119V - 21V}{95V - 57V} \approx \sqrt{6}$$

Similarly, the time at which the initial spike occurs is inversely proportional to the square root of C according to the equation (**). The higher value of the capacitor 55 causes a longer and softer decay of the input current flowing through the diode 54. That is very advantageous. The ratio has the same result again:

$$\frac{2000ns}{800ns} \approx \sqrt{6}$$

The collector voltage waveforms also confirm that the frequency of the parasitic oscillations does not depend on the value of the capacitor 55.

Figure 7:
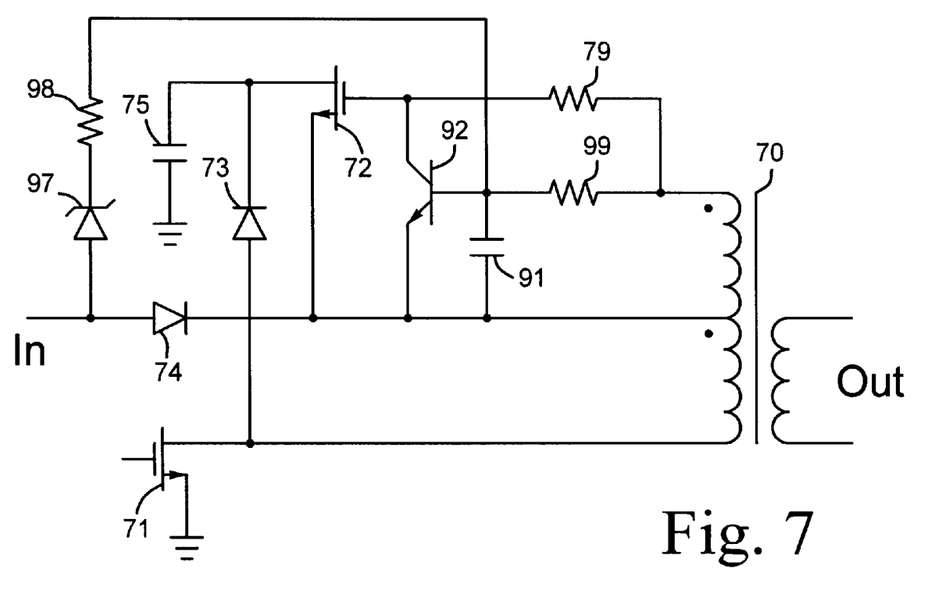
FIG. 7 is the preferred embodiment with an auxiliary N-channel MOSFET and its driver.

FIG. 7 is the preferred embodiment with an auxiliary switch 72, N-channel MOSFET, and its driver. NPN transistor can be also used. This embodiment is based on FIG. 4 and has numerous advantages over the FIG. 5 embodiment. Power N-channel MOSFETs perform better, are available in a wider range and cost less than equivalent power PNP transistors or P-channel MOSFETs. Moreover, the gate voltage of the switch 72 derives from an additional winding of the transformer 70. This allows a significant reduction of the output impedance of the driver while minimizing its power losses. The zener diode 97 affects the base voltage of the switch 92, NPN transistor, rather than the gate voltage of the switch 72. The power dissipation of the diode 97 is dramatically reduced although its zener voltage remains high. Finally, only two diodes 73 and 74 conduct the leakage current.

The power transformer 70 has the primary winding connected between the anode and the cathode of the diodes 73 and 74 respectively. The output circuit shown in FIG. 4 can be used for converting a voltage appearing across the secondary winding into the output voltage, wherein the SPS can operate in the forward and/or flyback modes. The anode of the diode 74 is connected to the input of the SPS. The drain and source of the main switch 71, N-channel MOSFET, are connected to the anode of the diode 73 and ground respectively. The drain and source of the switch 72 are connected to the cathodes of the diodes 73 and 74 respectively. The capacitor 75 is connected between the cathode of the diode 73 and ground.

The control circuit of the switch 72 comprises the remaining components. Specifically, the additional winding is connected to the cathode of the diode 74 on one end and the resistors 79, 99 on the other end. These resistors are further connected to the gate of the switch 72 and the base of the switch 92 respectively. The collector and emitter of the switch 92 are connected to the gate and source of the switch 72 respectively. The capacitor 91 is connected between the base and emitter of the switch 92. The zener diode 97 and the resistor 98 are connected in series between the base of the switch 92 and the input.

When the switch 71 turns on, the primary voltage of the transformer 70 rapidly increases. A proportionally smaller voltage appears across the additional winding and the switch 72 turns on. That voltage is also applied to the resistor 99. The base-emitter voltage required to turn on the switch 92 is smaller than the threshold voltage of the switch 72. However, the switch 92 remains open due to a delay caused by the resistor 99 and the capacitor 91. The voltage stored in the capacitor 75 is applied across the primary winding. The voltage between the base of the switch 92 and the input is substantially greater than the zener voltage of the diode 97. Therefore, the switch 92 continues to be open as its base voltage produced by the resistor divider 98, 99 remains insufficient.

The increasing primary current discharges the capacitor 75. Consequently, the emitter voltage of the switch 92 drops. This is further reflected by a decreasing current flowing through the zener diode 97 and the resistors 98, 99, and an increasing base voltage of the switch 92. Eventually, the switch 92 turns on and cuts off the gate voltage of the switch 72. The resistor 79 limits the collector current of the switch 92. When the switch 72 turns off, the diode 74 takes over the primary current and the voltage applied across the primary winding is reduced to the input voltage of the SPS. The current flowing through the diode 97 and the resistor 98 drops to zero and the switch 92 is driven even harder into the saturation.

The voltage provided by the additional winding depends on the input voltage of the SPS, with the switch 71 turned on. Consequently, the voltage appearing at the base of the switch 92 depends on the input voltage. If the SPS handles an input voltage that may vary in a wide range, such as universal line voltage, the accuracy of the desirable voltage to which the capacitor 75 is discharged may be insufficient. However, some simple modifications can dramatically improve that accuracy. For example, if the resistor 98 is eliminated, the desirable voltage is approximately equal to the zener voltage of the diode 97 regardless of the input voltage level. However, additional components are required to protect the base-emitter junction of the switch 92. When the switch 71 is turned off, the diodes 73 and 74 conduct the leakage current of the transformer 70. The voltage across the capacitor 75 rises. The switches 72 and 92 are cut off as the additional winding provides a reverse voltage.

The parasitic oscillations and thus EMI/RFI of the SPS can be dramatically reduced by setting the proper value of the voltage to which the capacitor 75 is discharged, as shown hereinabove. Moreover, the result is further magnified by increasing the value of the capacitor 75. This requires higher current ratings of the switch 72. However, even if both switches 71 and 72 have the same current ratings, voltage ratings of the switch 72 remain smaller. Moreover, a higher cost of the switch 72 should be offset by savings coming from reduced input noise injected into the input source, reduced output noise delivered to the output load and, of course, minimized EMI/RFI. The employment of the capacitor 75 having the maximum value may be critical.

Similarly to the FIG. 5 embodiment, the discontinuous mode flyback SPS will be analyzed as an example. When the switches 71 and 72 are turned on, their drain currents are equal to the primary current of the transformer 70. This current discharges the capacitor 75, wherein the voltage stored therein is applied across the primary winding. Under full load, the capacitor voltage is approximately equal to the input voltage $V_{In}$ increased by the amount of the reflected voltage E, wherein $$V_{In} + E \gg \Delta V_C$$

The secondary current is zero and so the transformer 70 acts as an inductor having the magnetizing inductance $L_M$. Therefore, the primary current increases at a fixed rate A and reaches its peak J at time t, as expressed by the equation:

$$J = At$$

where $$A = \frac{V_{In} + E}{L_M}$$

The linearly increasing primary current causes a parabolically decreasing capacitor voltage. At time t, the capacitor 75 is discharged by the excess voltage of $\Delta V_C$:

$$\Delta V_c = \frac{A}{2C} t^2 = \frac{J^2}{2AC}$$

The worst case condition must be considered. The SPS must be capable of operating at the maximum input voltage $V_{InMax}$. This results in the highest rate $A_{Max}$ at which the primary current increases. Considering (*) and the last two equations, the maximum value of the capacitor 75** assumes the relationship:

$$C_{Max} = \frac{J^2}{4 A_{Max}^2 L} = \frac{J^2 L_M^2}{4L} \frac{1}{(V_{InMax} + E)^2} \quad (****)$$

The peak primary current J may vary only slightly with the input voltage of the SPS. The energy stored in the transformer 70 is proportional to $J^2$. This is also the energy delivered to the output circuit of the SPS. Actually, J is usually greater at lower input voltages as the SPS is less efficient. Obviously, L and $L_M$ are fixed. E is stable when the SPS reaches its normal operating temperature.

The ratio of the maximum to minimum frequency or pulse width of the SPS depends on the ratio of the maximum to minimum voltage applied across the primary winding of the transformer 70. In conventional SPSs, the latter ratio is determined by the maximum and minimum input voltages. By contrast, the voltage stored in the capacitor 75 rather than the input voltage of the SPS is applied across the primary winding of the transformer 70. The respective ratio is reduced:

$$\frac{V_{InMax} + E}{V_{InMin} + E} < \frac{V_{InMax}}{V_{InMin}}$$

The SPS can thus operate at a higher switching frequency. This leads to reduced size and costs, and further improved EMI/RFI performance.

Figure 8:
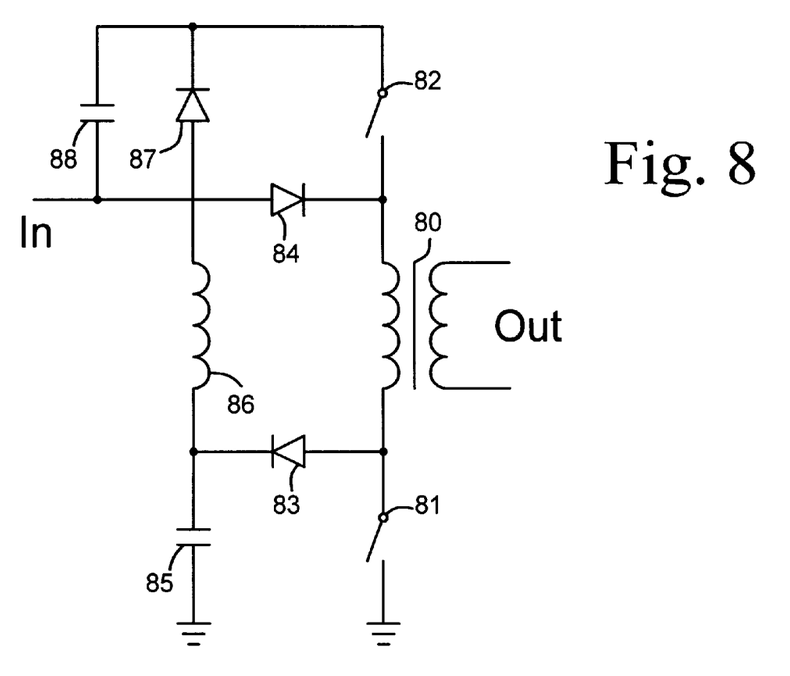
FIG. 8 is the embodiment with an additional capacitor allowing uninterrupted input current at any time.

FIG. 8 is the embodiment with an additional capacitor allowing uninterrupted input current at any time. The components 80–85 correspond to the respective components 40–45, 50–55 and 70–75 of FIGS. 4, 5 and 7. These embodiments employ the single capacitor 45, 55 and 75 respectively for storing a voltage that is a sum of the input voltage and the auxiliary voltage. When the main and auxiliary switches are closed, the capacitor delivers the primary current, whereas the input current of the SPS is zero. When the auxiliary switch turns off, the input current is abruptly increased to the primary current. By contrast, when the main switch turns off, the input current continues to flow as the leakage current of the transformer.

This is a compromise. The capacitor could be connected to the input of the SPS, similarly to 35 of FIG. 3. The initial abrupt increase of the input current would be eliminated, at least in case of the discontinuous mode operation. However, the input current would be interrupted at the worst possible moment, i.e., upon reaching its peak. Therefore, two capacitors are needed to allow a smooth development of the input current. If the SPS operates in the discontinuous mode, the input current is uninterrupted at any time. Otherwise, the initial abrupt increase of the input current is not degraded.

Initially, adding one capacitor can be considered. The capacitor 88 is connected between the cathode of the diode 83 and the input. The components 86 and 87 are not used, wherein the switch 82, the cathode of the diode 83 and the capacitors 85, 88 are tied together. When both switches 81 and 82 are closed, the input current of the SPS is equal only to a portion of the primary current flowing through the capacitor 88. The remaining portion of the primary current flows through the capacitor 85. When the switch 82 turns off, the capacitors 85 and 88 are effectively coupled in series across the input. The input current is abruptly increased to the full primary current. Similarly, when the switch 81 turns off, the input current of the SPS is abruptly reduced from the peak primary current to a portion of the leakage current flowing through the capacitor 85. The remaining portion of the leakage current flows through the capacitor 88. Although the first transition of the input current is minimized, the second transition is introduced.

The inductor 86 and the diode 87 are used to separate the effects of the capacitors 85 and 88. Therefore, the inductor 86 and the diode 87 are connected in series between the capacitors 85 and 88. The diode 87 rectifies the inductor current and thus prevents an undesirable energy flow from the capacitor 88 back to the capacitor 85.

When both switches 81 and 82 turn on, the input current ramps up. A sum of the input voltage of the SPS and the voltage stored in the capacitor 88 is preferably greater than the voltage across the capacitor 85. The input current flows through the capacitor 88 and is equal to a difference between the primary current and the inductor current, if any. The input current changes thus its polarity if the inductor current is present. Nevertheless, the input current remains uninterrupted if the SPS operates in the discontinuous mode. Otherwise, the initial transition is not degraded.

When the switch 82 turns off, the input current is unchanged even if the inductor current is present. The input current is equal to a difference between the leakage current flowing through the diode 84 and the inductor current flowing through the capacitor 88. The leakage current charges the capacitor 85, wherein the inductor current increases. Therefore, the input current changes its polarity once before the leakage current decays to zero. The inductor current discharges the capacitor 85 and charges the capacitor 88.

The switch 82 turns off in response to an error voltage. That voltage is equal to a difference between the desired and instant voltages across the capacitor 85 when the switch 81 turns off. Preferably, the inductor current is then zero, wherein the capacitor 85 is fully discharged. The desired voltage is a sum of the input voltage of the SPS and the auxiliary voltage. The latter voltage is regulated to be equal to the reflected voltage in order to accomplish sought advantages of the low noise operation.

A simplified model can be used to more clearly show the circuit operation. $L_{86}$ is the value of the inductor 86. It is assumed that $L_{86}$ is significantly larger than the value of the leakage inductance of the transformer 80. This corresponds to the leakage current instantly charging the capacitor 85 through the diode 83 to a peak voltage. Immediately thereafter, at t=0, the transfer of the energy from the capacitor 85 to the capacitor 88 starts. These capacitors and the inductor 86 constitute yet another resonant network. $L_{86}$ is chosen so that the inductor current can reach zero while the switch 81 is turned off. Therefore, when the energy transfer is completed, the capacitor 85 is discharged to its minimum voltage and the capacitor 88 is charged to its maximum voltage. The respective capacitor voltages $V_{C85}$ and $V_{C88}$ with reference to a voltage $V_0$ are:

$$V_{C85} = V_0 \frac{C_{85} - C_{88}}{C_{85} + C_{88}}$$

$$V_{C88} = 2V_0 \frac{C_{85}}{C_{85} + C_{88}}$$

where $V_0$ is a difference between the voltage of the fully charged capacitor 85, and a sum of the fully discharged capacitor 88 and the input voltage of the SPS. Therefore, $V_0$ is determined at t=0. Moreover, by adjusting the initial voltage stored in the capacitor 88, the final voltage of the capacitor 85 is established. That initial voltage is set when the switch 82 turns off. $C_{85}$ and $C_{88}$ are the values of the capacitors 85 and 88 respectively.

$C_{85}$ can be set to $C_{Max}$ according to the equation (**). $C_{88}$ has preferably the same value. By these means, the voltage of the capacitor 85 is decreased by $V_0$ and the voltage of the capacitor 88** is increased by the same amount. The inductor current is sinusoidal and has a peak:

$$i_{L86Max} = V_0 \sqrt{\frac{C_{85} \| C_{88}}{L_{86}}}$$

$L_{86}$ should be largest possible in order to minimize the peak inductor current. In this model, the transfer of the energy from the capacitor 85 to 88 is completed while the switch 81 is turned off. Therefore, $L_{86}$ assumes the relationship:

$$L_{86} = \frac{1}{\pi^2} \frac{t_{offMin}^2}{C_{85} \| C_{88}}$$

where $t_{offMin}$ is the shortest turn-off time of the switch 81.

$L_{86}$ can be even larger. The switches 81 and 82 can turn on while the inductor current continues to flow. The inductor 86 simply continues to transfer the excess energy initially stored in the leakage inductance. Some energy is returned to the input source when the inductor current is greater than the primary or leakage current. However, that reverse energy flow amounts to a mere fraction of the leakage energy and is relatively slow. The primary current quickly becomes greater than the inductor current. Moreover, it takes much longer for the inductor current to charge the capacitor 88 than for the leakage current to charge capacitor 85. In any case, the switch 82 turns off so that the minimum voltage across the capacitor 85 is equal to the sum of the input voltage and the reflected voltage.

The embodiments of the present invention described herein are intended to be taken in an illustrative and not a limiting sense. Various modifications and changes may be made to these embodiments by persons skilled in the art without departing from the scope of the present invention as defined in the appended claims.

I claim:

1. Switching power supply converting an input voltage applied between an input terminal and ground into an output voltage comprising:

a first inductive means coupled to the input terminal for attaining a first current and providing the output voltage;

a first switching means for selectively applying the first current to ground;

a capacitive means having a terminal for storing a voltage;

a rectifying means for applying the first current to the capacitive means terminal;

a second inductive means for attaining a second current; and a second switching means for selectively applying the second current to the capacitive means terminal.

2. Switching power supply of claim 1 wherein the second inductive means has a terminal coupled to the second switching means, and further including a second rectifying means coupled to the second inductive means terminal for applying the second current to the input terminal or ground.

3. Switching power supply of claim 1 wherein the first inductive means includes:

a primary inductive means for attaining the first current; and a secondary inductive means electromagnetically coupled to the primary inductive means for providing the output voltage.

4. Switching power supply converting an input voltage applied between an input terminal and ground into an output voltage comprising:

an inductive means for providing the output voltage, and having a first and second terminals for attaining a current;

a capacitive means for storing a voltage;

a first switching means for selectively coupling the first terminal to ground;

a first rectifying means coupled to the first terminal for applying the current to the capacitive means;

a second switching means coupled to the second terminal for selectively applying the current to the capacitive means; and a second rectifying means coupled to the second terminal for applying the current to the input terminal.

5. Switching power supply of claim 4 wherein the capacitive means has a terminal, and further including a means for controlling the second switching means in response to a voltage appearing between the capacitive means terminal and the input terminal.

6. Switching power supply of claim 5 wherein the means for controlling is responsive to the current.

7. Switching power supply of claim 5 wherein the means for controlling is responsive to a voltage appearing at the first terminal.

8. Switching power supply of claim 5 wherein the means for controlling is responsive to a voltage appearing between the first and second terminals.

9. Switching power supply of claim 5 wherein first said inductive means includes:

a primary inductive means for attaining the first current;

an additional inductive means electromagnetically coupled to the primary inductive means for providing a signal, and further wherein the means for controlling is responsive to the signal.

10. Switching power supply of claim 9 wherein the additional inductive means is coupled to the second terminal.

11. Switching power supply of claim 5 wherein the means for controlling includes:

a comparator means having a pair of inputs for comparing a voltage appearing therebetween with the inputs separately coupled to the capacitive means terminal and the input terminal; and a source means coupled in series with one of the comparator means inputs for providing a reference voltage.

12. Switching power supply of claim 4 wherein the first rectifying means includes a pair of diodes coupled in series.

13. Switching power supply of claim 4 wherein the capacitive means includes a pair of capacitors separately coupled to the input terminal and ground.

14. Switching power supply of claim 4 further including:

a second capacitive means for storing a second voltage;

a second inductive means for attaining a second current; and a third rectifying means for rectifying the second current, wherein the second switching means selectively applies first said current to the second capacitive means, and further wherein the second inductive means and the third rectifying means are coupled in series between first said and the second capacitive means.

15. Switching power supply of claim 4 wherein first said inductive means includes:

a primary inductive means for attaining the current; and a secondary inductive means electromagnetically coupled to the primary inductive means for providing the output voltage.

16. Switching power supply of claim 4 further including:

a third rectifying means for rectifying first said output voltage; and a second capacitive means coupled to the third rectifying means for storing a second output voltage.

17. Switching power supply of claim 4 further including:

a third rectifying means for rectifying first said output voltage;

a second inductive means coupled to the third rectifying means for attaining a second current; and a second capacitive means coupled to the second inductive means for storing a second output voltage.

18. Switching power supply of claim 17 wherein the third rectifying means includes a pair of diodes coupled in series with the output voltage applied thereacross.

19. Switching power supply of claim 17 wherein first said inductive means provides a third output voltage, and further including a fourth rectifying means coupled to the second capacitive means for rectifying the third output voltage.

* * * * *